(12) United States Patent
Son

(10) Patent No.: US 9,658,703 B2
(45) Date of Patent: May 23, 2017

(54) METHOD AND APPARATUS FOR OPERATING MOBILE TERMINAL

(71) Applicant: Samsung Electronics Co., Ltd, Gyeonggi-do (KR)

(72) Inventor: Yoon-Kook Son, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 14/046,821

(22) Filed: Oct. 4, 2013

(65) Prior Publication Data

US 2014/0098047 A1   Apr. 10, 2014

(30) Foreign Application Priority Data

Oct. 5, 2012  (KR) .................. 10-2012-0110725

(51) Int. Cl.
*G06F 3/0354* (2013.01)
*G06F 3/0488* (2013.01)

(52) U.S. Cl.
CPC ........ *G06F 3/03545* (2013.01); *G06F 3/0488* (2013.01)

(58) Field of Classification Search
CPC ...... G06F 3/041; G06F 3/0416; G06F 3/0412; G06F 3/016; G06F 3/04883; G06F 3/0488; G06F 2203/04104; G06F 3/0414

USPC .......... 345/173, 175, 76, 178, 901; 715/702, 715/751, 781, 769; 178/18.01–18.09
See application file for complete search history.

(56) References Cited

U.S. PATENT DOCUMENTS

| | | | |
|---|---|---|---|
| 2001/0013861 A1* | 8/2001 | Shimizu | .................. 345/173 |
| 2006/0109252 A1* | 5/2006 | Kolmykov-Zotov et al. | .................. 345/173 |
| 2006/0197750 A1* | 9/2006 | Kerr | ............... G06F 1/1626 345/173 |
| 2008/0284743 A1* | 11/2008 | Hsu | ............... G06F 3/0488 345/173 |
| 2010/0095205 A1* | 4/2010 | Kinoshita | .................. 715/702 |
| 2011/0175834 A1 | 7/2011 | Han et al. | |
| 2012/0158629 A1* | 6/2012 | Hinckley | ............... G06F 3/038 706/15 |

FOREIGN PATENT DOCUMENTS

KR   20120029447 A   3/2012

* cited by examiner

*Primary Examiner* — Olga Merkoulova

(57) ABSTRACT

There is provided a method of operating a mobile terminal, the method including: executing an application using both a pen input and a touch input; sensing a pen input through a first input unit, and performing a function corresponding to the sensed pen input; and sensing a touch input through a second input unit, and performing a function corresponding to the sensed touch input.

14 Claims, 7 Drawing Sheets

|  | PEN INPUT | TOUCH INPUT |  |
|---|---|---|---|
| 300a | ◎ PEN | ◎ PEN | 310a |
| 300b | ◎ ERASER | ◎ ERASER | 310b |
| 300c | ◎ BRUSH | ◎ BRUSH | 310c |
| 300d | ◎ HIGHLIGHTER | ◎ HIGHLIGHTER | 310d |
|  | ⋮ | ⋮ |  |

FIG.3A

|  | PEN INPUT | TOUCH INPUT |  |
|---|---|---|---|
| 300a | ● PEN | ◎ PEN |  |
|  | ◎ ERASER | ● ERASER | 310b |
|  | ◎ BRUSH | ◎ BRUSH |  |
|  | ◎ HIGHLIGHTER | ◎ HIGHLIGHTER |  |
|  | ⋮ | ⋮ |  |

FIG.3B

| PEN INPUT | TOUCH INPUT |
|---|---|
| 400a ● PEN | ◎ COLOR OF PEN 410a |
| 400b ◎ ERASER | ● THICKNESS OF PEN 410b |
| 400c ◎ BRUSH | ◎ KIND OF PEN 410c |
| 400d ◎ HIGHLIGHTER | ⋮ |
| ⋮ | |

FIG.4A

| PEN INPUT | TOUCH INPUT |
|---|---|
| 400a ◎ PEN | ◎ COLOR OF BRUSH 420a |
| 400b ◎ ERASER | ● THICKNESS OF BRUSH 420b |
| 400c ● BRUSH | ◎ KIND OF BRUSH 420c |
| 400d ◎ HIGHLIGHTER | ⋮ |
| ⋮ | |

FIG.4B

METHOD AND APPARATUS FOR OPERATING MOBILE TERMINAL

CROSS-REFERENCE TO RELATED APPLICATION(S) AND CLAIM OF PRIORITY

The present application is related to and claims the benefit under 35 U.S.C. §119(a) of a Korean patent application filed on Oct. 5, 2012 in the Korean Intellectual Property Office and assigned Serial No. 10-2012-0110725, the entire disclosure of which is hereby incorporated by reference.

TECHNICAL FIELD

The present disclosure relates generally to a mobile terminal. More specifically, the present disclosure relates to a method of operating a mobile terminal using a pen or a body part such as a fingertip(s).

BACKGROUND

Mobile terminals have evolved to become multi-functional devices, such as a smart phone, a Tablet, etc., and provide various useful functions to users. Accordingly, the mobile terminals are becoming more common. Particularly, the smart phone or Tablet provides functions of playing multimedia and games.

However, since most of latest electronic devices, such as a smart phone or a Tablet, include no physical keyboard, there is inconvenience when they are used for a productive purpose such as word processing, compared to other electronic devices including physical keyboards, such as Notebook.

In order to remove the inconvenience, a mobile terminal with a display including a touch screen for receiving touch inputs and a digitizer for receiving pen inputs has been developed so that a user can conveniently perform word processing or painting on the mobile terminal by touching the touch screen using a body part (for example, a fingertip) or a pen (for example, an S pen).

Generally, when a user touches the touch screen of a mobile terminal using a pen or fingertip for word processing or painting, various virtual input tools are provided for the user.

If the user performs word processing, virtual input tools, e.g., a pen, an eraser, a brush, and a highlighter can be provided in order for the user to select one of the virtual input tools through a menu setting. For example, if the eraser is selected, a touch input or a pen input from the user functions as an eraser, and if the highlighter is selected, a touch input or a pen input from the user functions as a highlighter.

However, since latest mobile terminals have a minimum number of physical keys, in order to change a virtual input tool to another one, a user should stop word processing or painting, call a menu through a touch input or a pen input to change an input tool to a desired one, and then resume word processing or painting.

In other words, in order for a user to perform word processing or painting with various input tools, the user should repeatedly perform inconvenient operation of calling a menu and selecting an input tool.

Accordingly, a technique for quickly and conveniently performing word processing or painting through touch inputs and pen inputs by allowing a user to easily select an input tool or change detailed settings of the selected input tool is needed.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies of the prior art, it is a primary object of the present disclosure is to provide a technique for quickly and conveniently performing operations, such as word processing or painting, using touch inputs and pen inputs.

In accordance with an aspect of the present disclosure, there is provided a method of operating a mobile terminal, the method including: executing an application using both a pen input and a touch input; sensing a pen input through a first input unit, and performing a function corresponding to the sensed pen input; and sensing a touch input through a second input unit, and performing a function corresponding to the sensed touch input.

In accordance with another aspect of the present disclosure, there is provided an apparatus of operating a mobile terminal, the apparatus including: a display unit including a first input unit for receiving a pen input and a second input unit for receiving a touch input; and a controller performing a function corresponding to a pen input sensed through the first input unit, and a function corresponding to a touch input sensed through the second input unit, if an application using both the pen input and the touch input is executed.

Other aspects, advantages, and salient features of the disclosure will become apparent to those skilled in the art from the following detailed description, which, taken in conjunction with the annexed drawings, discloses certain embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3A illustrates a method of operating a mobile terminal according to embodiments of the present disclosure;

FIG. 3B illustrates a method of operating a mobile terminal according to embodiments of the present disclosure;

FIG. 4A illustrates a method of operating a mobile terminal according to embodiments of the present disclosure;

FIG. 4B illustrates a method of operating a mobile terminal according to embodiments of the present disclosure;

Throughout the drawings, like reference numerals will be understood to refer to like parts, components, and structures.

DETAILED DESCRIPTION

FIGS. 1 through 4E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The following description with reference to the accompanying drawings is provided to assist in a comprehensive understanding of embodiments of the disclosure as defined by the claims and their equivalents. It includes various specific details to assist in that understanding, which are mere examples. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of certain embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
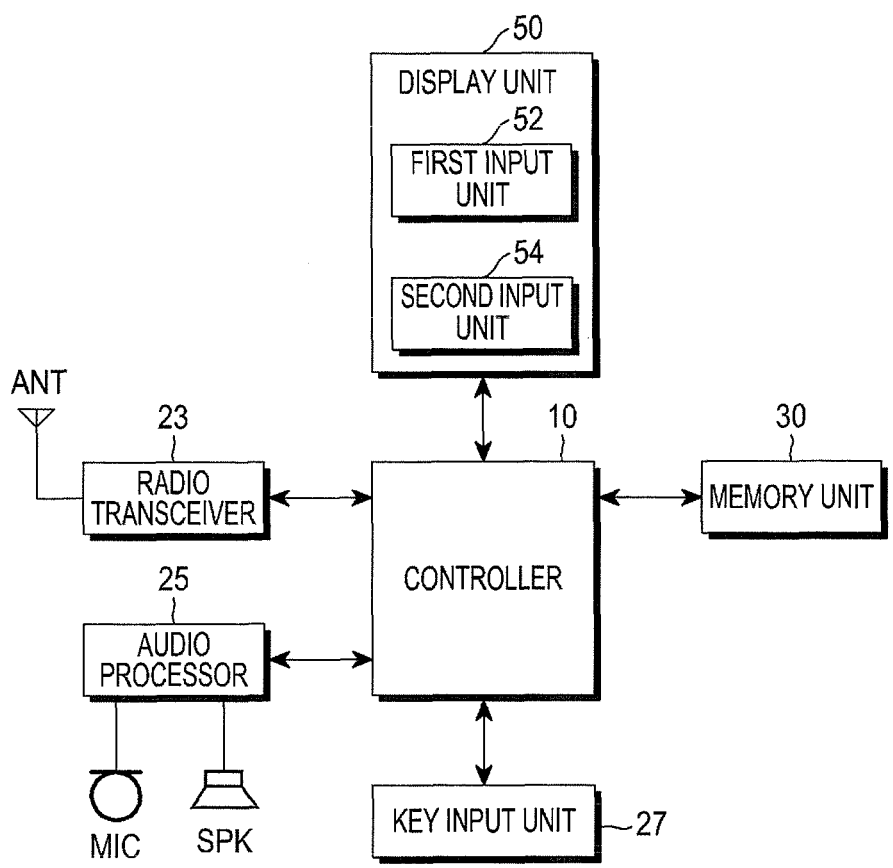
FIG. 1 is a block diagram illustrating a mobile terminal according to embodiments of the present disclosure.

FIG. 1 is a block diagram illustrating a mobile terminal according to embodiments of the present disclosure.

In this disclosure, the mobile terminal is assumed as a portable electronic device. The mobile terminal can be a feature phone or a device (for example, a smart phone and a tablet PC) that can be run on Bada™, Tizen™, Windows series (for example, Windows 8™), iOS™, Android™, etc. Also, the mobile terminal can be a notebook, a digital camera, or a video phone. However, the mobile terminal according to the present embodiment is not limited to the above-mentioned devices.

Referring to FIG. 1, the mobile terminal includes a controller 10, a radio transceiver 23, an audio processor 25, a key input unit 27, a memory unit 30, and a display unit 50 including a first input unit 52 and a second input unit 54. The radio transceiver 23 includes a Radio Frequency (RF) unit and a modem. The RF unit includes an RF transmitter for up-converting a frequency of a signal to be transmitted and amplifying the signal to be transmitted, and an RF receiver for low-noise amplifying a received signal and down-converting a frequency of the received signal. The modem includes a transmitter for encoding and modulating the signal to be transmitted, a receiver for demodulating and decoding a signal received from the RF unit, etc. However, it will be obvious to one of ordinary skill in the art that a short-range communication module such as a Wi-Fi module can be used to support the functions of the radio transceiver 23 or substitute for the radio transceiver 23.

Through the radio transceiver 23, a user shares contents (for example, paintings, handwritings, etc.) input through the first and second input units 52 and 54 with others.

The audio processor 25 constitutes a codec including a data codec and an audio codec. The data codec processes packet data, etc., and the audio codec processes audio signals, such as voice, multimedia files, etc. The audio processor 25 converts a digital audio signal received from the modem into an analog signal through the audio codec to then reproduce the analog signal, or converts an analog audio signal received from a microphone into a digital audio signal through the audio codec to transmit the digital audio signal to the modem. The data codec and the audio codec can be separately provided or included in the controller 10.

By using, the audio processor 25, the controller 10 recognizes contents (for example, handwritings) input through the first and second input units 52 and 54, convert the recognized contents into text, and output the text as voice information for the user. Thereby, the user can aurally determine whether the contents input through the first and second input units 52 and 54 have been correctly input according to his/her intention.

The key input unit 27 includes keys for allowing a user to input numerical and text information, functional keys for setting various functions, a touch pad, etc. If the display unit 50 is implemented as a touch screen, the key input unit 27 includes a minimum number of predetermined keys, and the display unit 50 provides a part of the key input functions of the key input unit 27.

The key input unit 27 can be used independently or together with the first and second input units 52 and 54. Through the key input unit 27, the user provides a user input (for example, text) suitable for an execution environment of the mobile terminal.

The memory unit 30 includes a program memory and a data memory. The program memory stores programs for controlling the general operations of the mobile terminal. The memory unit 30 can further include Compact Flash (CF), Secure Digital (SD), Micro Secure Digital (Micro-SD), Mini Secure Digital (Mini-SD), Extreme Digital (xD), and an external memory, such as a memory stick and the like. Also, the memory unit 30 can include a disk, such as a Hard Disk Drive (HDD) and a Solid State Disk (SSD).

The display unit 50 can be a Liquid Crystal Display (LCD) or an Organic Light Emitting Diodes (OLED) such as PMOLED or AMOLED, and displays various data generated in the mobile terminal.

The display unit 50 includes a plurality of input units that are comprised of a first input unit 52 for receiving pen inputs from the user and a second input unit 54 for receiving capacitive touch inputs from the user. The display unit 50 can be a display used in Galaxy Note of Samsung Electronics. Accordingly, the first and second input units 52 and 54 can operate as input units for controlling the mobile terminal together with the key input unit 27.

The first input unit 52 is an input unit for receiving pen inputs through a pen (for example, an S pen of Samsung Electronics) operating based on electromagnetic induction, and includes a digitizer for sensing a location and pressure of the pen based on electromagnetic induction, a controller, etc. The pen is dedicated to operate according to an operation method (for example, electromagnetic induction) of the first input unit 52. Accordingly, a pen input from a user is sensed only by the first input unit 52, not by the second input unit 54, which will be described in more detail, later.

The second input unit 54 includes a capacitive-type touch screen panel, a controller, etc., and receives a touch input from a user according to a contact of a body part with the capacitive-type touch screen panel. The second input unit 54 is based on an operation method which is different from that of the first input unit 52. Accordingly, a touch input from a user is sensed only by the second input unit 54, not by the first input unit 52. However, it will be obvious to one of ordinary skill in the art that the second input unit 54 can operate based on resistance, instead of capacitance.

As described above, since the first input unit 52 senses a pen input based on electromagnetic induction, and the second input unit 54 senses a touch input based on capacitance, no pen input will be sensed by the second input unit 54 and no touch input will be sensed by the first input unit 52.

For example, if the user touches the surface of the display unit 50 with his/her fingertip, the second input unit 54 senses a touch input, but the first input unit 52 senses no input. Meanwhile, if the user touches the surface of the display unit 50 with a pen, the first input unit 52 senses a pen input, but the second input unit 54 senses no input.

The controller 10 controls the entire operation of the mobile terminal, and can switch or control operations of the mobile terminal according to a user input received through the key input unit 27, the display unit 50, etc. Particularly, the controller 10 controls operations of: executing an application using both a pen input and a touch input; sensing a pen input through the first input unit 52, and performing a function corresponding to the sensed pen input; and sensing a touch input through the second input unit 54, and performing a function corresponding to the sensed touch input. The operations of the controller 10 will be described in more detail, later.

Meanwhile, in FIG. 1, devices, such as a Bluetooth module, a camera module, a Wi-Fi module, an accelerometer, a proximity sensor, a geomagnetic sensor, a Digital Media Broadcasting (DMB) receiver, etc., which can be included in the mobile terminal, are not illustrated. However, it will be obvious to one of ordinary skill in the art that the above-mentioned devices can be included in the mobile terminal to provide the corresponding functions.

Figure 2:
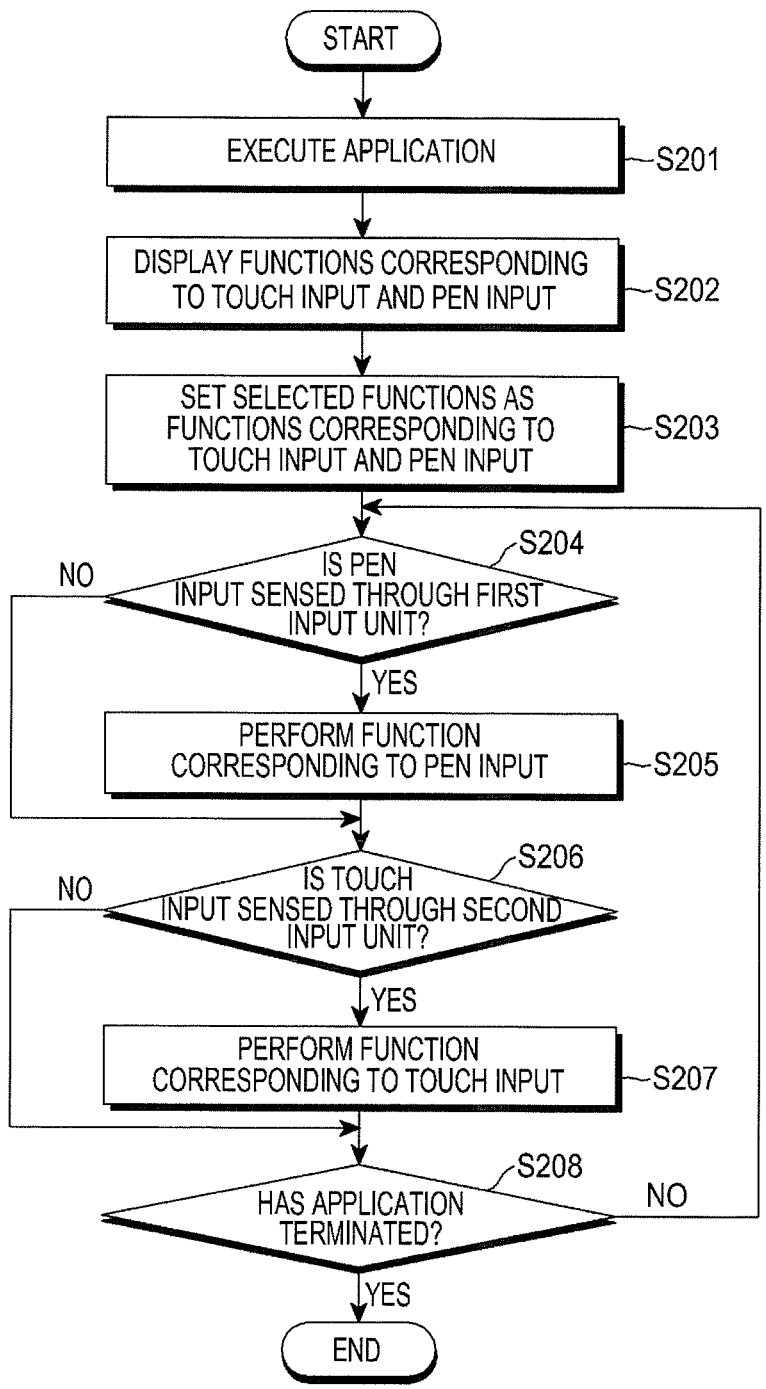
FIG. 2 is a flowchart illustrating a method of operating a mobile terminal, according to embodiments of the present disclosure.

FIG. 2 is a flowchart illustrating a method of operating a mobile terminal, according to embodiments of the present disclosure. Also, FIGS. 3A to 3D certain methods of operating the mobile terminal according to embodiments of the present disclosure. Also, FIGS. 4A to 4E certain methods of operating the mobile terminal according to embodiments of the present disclosure. Hereinafter, the method of operating the mobile terminal using a pen, a fingertip, etc. will be described with reference to FIGS. 1, 3A to 3D and 4A to 4E.

In operations S201 to S203, the controller 10 executes an application according to a request from a user, displays functions corresponding to a touch input and a pen input, and then sets functions selected by a user to functions corresponding to the touch input and the pen input, respectively In a conventional technique, since a pen input and a touch input are considered as the same user input, a pen input and a touch input are allocated the same functions.

For example, when an application, such as a memo or painting, is executed, a function selected from among a pen, an eraser, a brush, and a highlighter is performed according, to a user input regardless of whether the user input is a pen input or a touch input. That is, if the eraser is selected, both a pen input and a touch input perform the same function of the eraser.

As another example, if a user wants to perform a highlighter function when performing a pen function through a pen input (or a touch input), the user should set a function corresponding to a pen input (or a touch input) to the highlighter function from the pen function, which can cause inconvenience.

In the embodiment of FIG. 3A, functions corresponding to a pen input are denoted by 300a, 300b, 300c, and 300d, and functions corresponding to a touch input are denoted by 310a, 310b, 310c, and 310d.

A pen function denoted by 300a enables a pen input to function as if it is an actual pen, an erase function denoted by 300b enables a pen input to function as if it is an actual eraser, a brush function denoted by 300c enables a pen input to function as if it is an actual brush, and a highlighter function denoted by 300d enables a pen input to function as if it is an actual highlighter. Likewise, each of pen, eraser, brush, and highlighter functions denoted by 310a, 310b, 310c, and 310d, respectively, enables a touch input from a body part (for example, a fingertip) to function as if it is an actual pen, an actual eraser, an actual brush, or an actual highlighter.

As illustrated in FIG. 3A, if functions corresponding to a pen input and a touch input, respectively, are displayed, a user can select a function corresponding to a pen input and a function corresponding to a touch input. For example, as illustrated in FIG. 3B, a user can select the pen function 300a as a function corresponding to a pen input, and the erase function 300b as a function corresponding to a touch input.

In FIG. 3A, a case of independently setting functions corresponding to a pen input and a touch input is illustrated. However, according to another embodiment, it is possible to set a function corresponding to an input type (for example, a pen input), and then set a function corresponding, to the other input type (for example, a touch input) as a sub function of the function set to correspond to the input type.

For example, if a request for setting functions corresponding to a pen input and a touch input is received from a user (or automatically when an application is executed), the controller 10 controls the display unit 50 to display a setting screen as illustrated in FIG. 4A or 4B.

Referring to FIG. 4A, an example in which a user has selected a "pen" 400a as a function corresponding to a pen input, and then selected a sub function (for example, the color of the pen, the thickness of the pen, the kind of the pen, etc.) of the "pen" function, as a function corresponding to a touch input is illustrated. Likewise, referring to FIG. 4B, an example in which a user has selected a "brush" 400c as a function corresponding to a pen input, and then selected a sub function (for example, the color of the brush, the thickness of the brush, the kind of the brush, etc.) of the "brush" function, as a function corresponding to a touch input is illustrated.

As illustrated in FIG. 3A or 4A, a setting screen for setting (selecting) functions corresponding to a pen input and a touch input, respectively, is displayed in such a manner to allow a user to set menus, icons, etc. Also, the application executed in operation S201 is an application that enables a user to simultaneously use a pen input and a touch input, and can be a memo application, a painting application, etc.

In operations S204 to S207, if the controller 10 determines that a pen input has been received through the first input unit 52, the controller 10 performs a function corresponding to the pen input, and if the controller 10 determines that a touch input has been received through the second input unit 54, the controller 10 performs a function corresponding to the touch input.

As described above in operations S201 to S203, if functions corresponding to a pen input, sensible only by the first input unit 52, and a touch input, sensible only by the second input unit 54, respectively, are set, the user can use the application with the functions corresponding to the pen input and the touch input according to the corresponding settings.

Figure 3C:
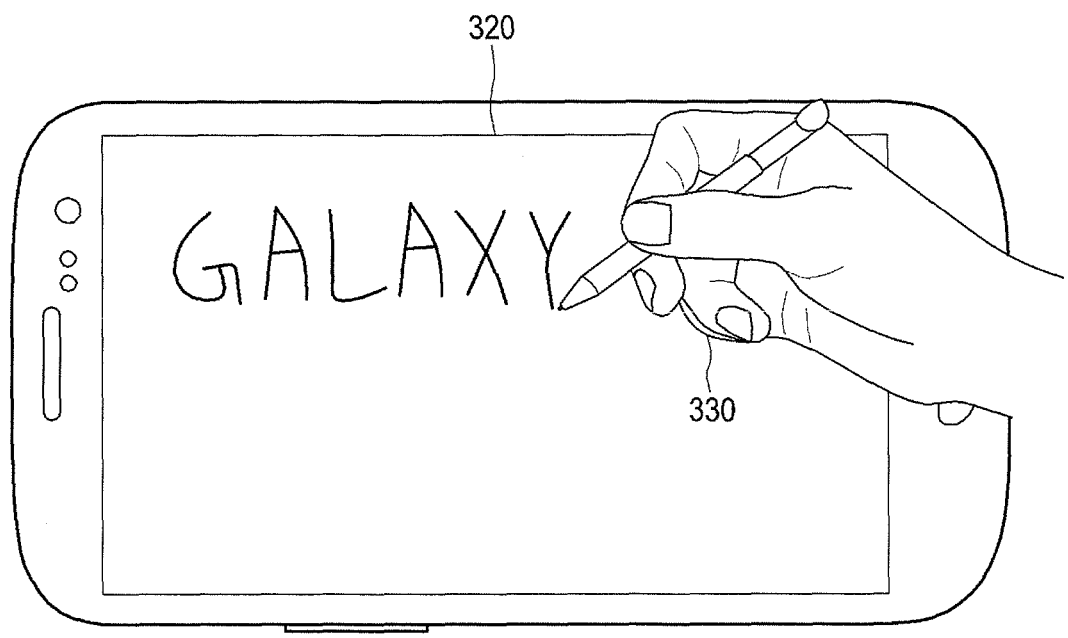
FIG. 3C illustrates a method of operating a mobile terminal according to embodiments of the present disclosure.
Figure 3D:
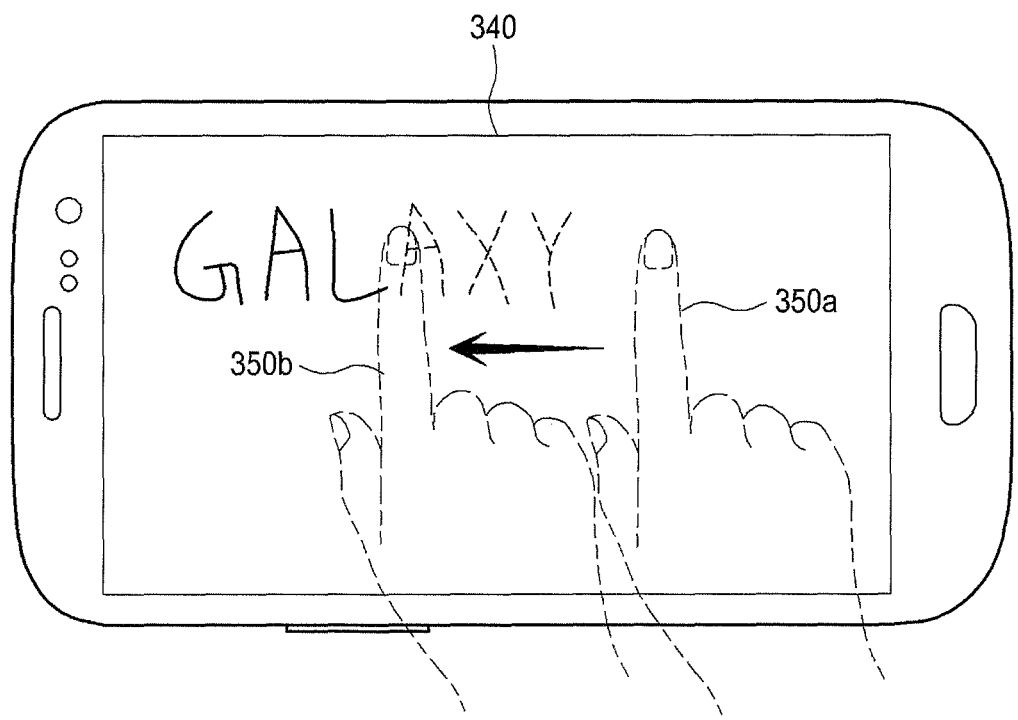
FIG. 3D illustrates a method of using a mobile terminal according to embodiments of the present disclosure.

As illustrated in FIG. 3B, if a "pen" function is set as a function corresponding to a pen input and an "eraser" function is set as a function corresponding to a touch input, the user can use the set functions as illustrated in FIGS. 3C and 3D.

Referring to FIGS. 3C and 3D, when the user handwrites "GALAXY" using a pen and then wants to erase "AXY", the user can perform a touch input (see 350a and 350b) erasing "AXY" with his/her fingertip instead of the pen, thereby easily erasing "AXY".

According to the example as illustrated in FIGS. 3C and 3D, since a pen input is set to have a pen function and a touch input is set to have an erase function, a user can handwrite letters and easily erase a desired part of the handwritten letters as necessary, without a separate menu setting (for example, changing a pen function to an erase function).

The examples described above with reference to FIGS. 3A to 3D relate to a case in which functions set for a pen input sensible by the first input unit 52 are different from functions set for a touch input sensible by the second input unit 54.

Meanwhile, the following examples, which will be described with reference to FIGS. 4A to 4D, relate to a case in which functions set for a touch input sensible by the second input unit 54 are sub functions of functions set for a pen input sensible by the first input unit 52.

Figure 4C:
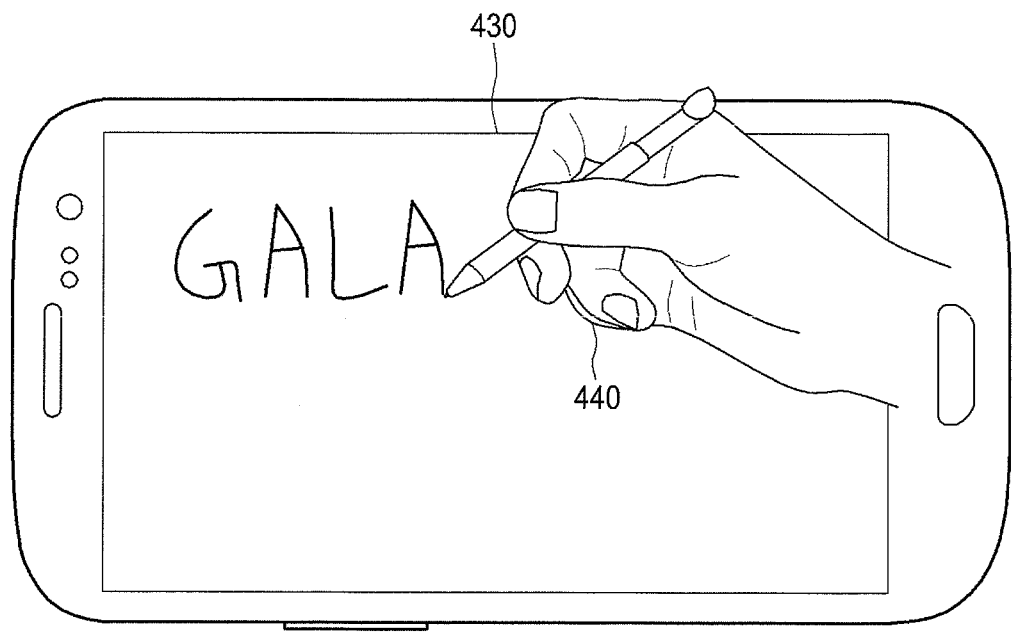
FIG. 4C illustrates a method of operating a mobile terminal according to embodiments of the present disclosure.
Figure 4D:
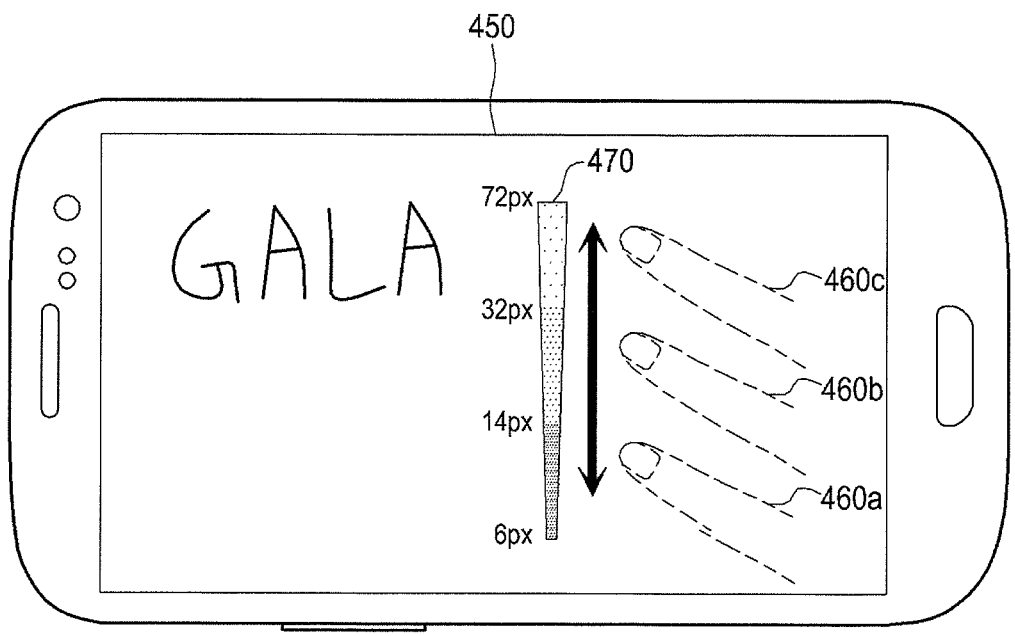
FIG. 4D illustrates a method of operating a mobile terminal according to embodiments of the present disclosure.
Figure 4E:
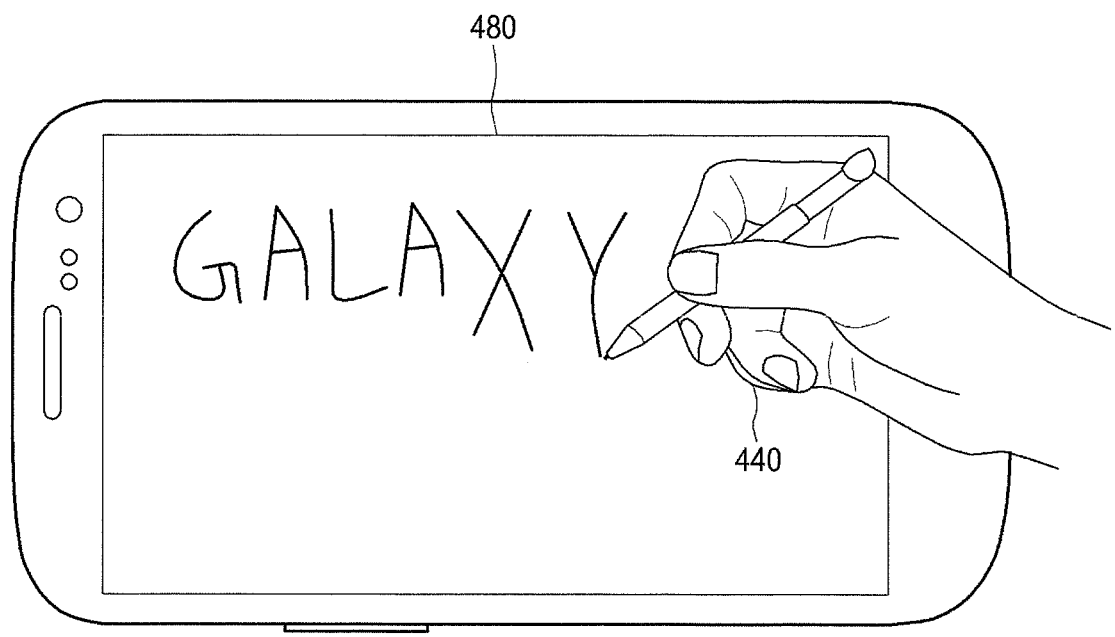
FIG. 4E illustrates a method of operating the mobile terminal according to embodiments of the present disclosure.

FIGS. 4C to 4E correspond to a case in which a pen function 400a is set as a function corresponding to a pen input, and a sub function of the pen function 400a is set as a function corresponding to a touch input.

As illustrated in FIG. 4C, there is a case in which when a user has handwritten letters "GALA" with a pen on a display screen 430, the user wants to adjust the size of letters to be handwritten.

In order to adjust the size of letters to be handwritten, as illustrated in FIG. 4D, the user can touch the display screen 430 with a fingertip instead of a pen. For example, if the user touches the display screen 430 with his/her fingertip, a setting graph 470 for adjusting the size of letters to be handwritten is displayed so that the user can select a desired size from the setting graph 470 through a touch input (for example, a drag operation in an up-down direction) such as a touch operation denoted by 460a, 460b, or 460c.

For example, if the user touches the bottom part of the setting graph 470, the size of letters will be adjusted to 6 pixels (6 px) (or to 6 points (6 px) or 6 ems (6 em) in a unit of point or ems), and if the user touches the top part of the setting graph 470, the size of letters will be adjusted to 72 pixels (72 px).

If the size of letters to be handwritten through a pen input is adjusted as described above with reference to FIG. 4D, the user can input next letters XY with the adjusted size on the display screen 480 through a pen input 440, as illustrated in FIG. 4E.

According to the examples described above with reference to FIGS. 4A to 4D, since when handwriting letters through a pen input, a user can easily adjust the size of letters through a touch input using a fingertip without having to newly set an icon or menu, the user can easily handwrite letters using a pen input.

In operation S208, after the controller 10 performs the function corresponding to the pen input or the touch input received through the first input unit 52 and the second input unit 54, the controller 10 determines whether the application executed in operation S201 has terminated.

Meanwhile, in the present embodiment described above with reference to FIG. 2, operations S202 to S203 are performed prior to operations S204 to S207, however, operations S202 to S203 can be performed between other operations according to the user's request or the application's setting.

Therefore, according to the embodiments of the present disclosure as described above, a user can conveniently use a mobile terminal through a pen input and a touch input without having to perform inconvenient operations such as icon or menu settings.

Although the present disclosure has been described with certain embodiments, various changes and modifications may be suggested to one skilled in the art. It is intended that the present disclosure encompass such changes and modifications as fall within the scope of the appended claims.

What is claimed is:

1. A method implemented using a mobile terminal, the method comprising:
    setting a first function corresponding to a pen input, according to a first user selection among a first set of functions displayed on a display unit of the mobile terminal;
    setting a second function corresponding to a touch input, according to a second user selection among a second set of functions displayed on the display unit of the mobile terminal;
    in response to sensing the pen input on the display unit through a first input unit of the mobile terminal while executing a first application, performing the first function on the display unit; and
    in response to sensing the touch input on the display unit through a second input unit of the mobile terminal while executing the first application, performing the second function on the display unit.

2. The method of claim 1, wherein the second function that corresponds to the sensed touch input cancels the first function that corresponds to the sensed pen input.

3. The method of claim 1, wherein the second function that corresponds to the sensed touch input is a sub function of the first function that corresponds to the pen input.

4. The method of claim 1, wherein the first function that corresponds to the sensed pen input is selected as one of a pen, an eraser, a brush, or a highlighter.

5. The method of claim 4, wherein the second function that corresponds to the sensed touch input is different from the first function that corresponds to the sensed pen input and is selected as one of a pen, an eraser, a brush, or a highlighter.

6. An apparatus of a mobile terminal, the apparatus comprising:
- a display unit including a first input unit configured to receive a pen input and a second input unit configured to receive a touch input; and
- a controller configured to set a first function corresponding to a pen input, according to a first user selection among a first set of function displayed on the display unit of the mobile terminal and a second function corresponding to a touch input, according to a second user selection among a second set of functions displayed on the display unit of the mobile terminal, perform the first function on the display unit in response to sensing the pen input on the display unit through the first input unit, and perform the second function on the display unit in response to sensing the touch input on the display unit through the second input unit.

7. The apparatus of claim 6, wherein the second function that corresponds to the touch input cancels the first function that corresponds to the pen input.

8. The apparatus of claim 6, wherein the second function that corresponds to the touch input is a sub function of the first function that corresponds to the pen input.

9. The apparatus of claim 6, wherein the first function that corresponds to the sensed pen input is selected as one of a pen, an eraser, a brush, or a highlighter.

10. The apparatus of claim 9, wherein the second function that corresponds to the sensed touch input is different from the first function that corresponds to the sensed pen input and is selected as one of a pen, an eraser, a brush, or a highlighter.

11. A mobile terminal comprising:
- a display unit including a first input unit configured to sense a pen input and a second input unit configured to sense a touch input; and
- a controller configured to:
  - set a first function corresponding to a pen input, according to a first user selection among a first set of functions displayed on the display unit,
  - set a second function corresponding to a touch input, according to a second user selection among a second set of functions displayed on the display,
  - perform the first function on the display unit, in response to sensing the pen input on the display unit through the first input unit while executing a first application, and
  - perform the second function on the display, in response to sensing the touch input on the display unit through the second input unit while executing the first application.

12. The mobile terminal of claim 11, wherein the second function that corresponds to the touch input cancels the first function that corresponds to the pen input.

13. The mobile terminal of claim 11, wherein the second function that corresponds to the touch input is a sub function of the first function that corresponds to the pen input.

14. The mobile terminal of claim 11, wherein the first function that corresponds to the sensed pen input is selected as one of a pen, an eraser, a brush, or a highlighter, and wherein the second function that corresponds to the sensed touch input is different from the first function and is selected as one of a pen, an eraser, a brush, or a highlighter.

* * * * *